United States Patent
Guthrie et al.

[11] Patent Number: 6,132,841
[45] Date of Patent: Oct. 17, 2000

[54] WIPING DEVICE

[75] Inventors: Lee F. Guthrie, New Bern, N.C.; Paul E. Thomas, Terre Haute, Ind.

[73] Assignee: Tredegar Corporation, Richmond, Va.

[21] Appl. No.: 09/016,473

[22] Filed: Jan. 30, 1998

Related U.S. Application Data

[60] Provisional application No. 60/037,369, Feb. 6, 1997.

[51] Int. Cl.$^7$ ...................................................... B32B 3/24
[52] U.S. Cl. ...................... 428/132; 428/138; 428/131; 428/905; 428/913; 424/443; 424/413; 239/53; 239/55; 239/56; 239/57; 239/58; 15/221; 15/209.1; 15/104.93
[58] Field of Search .................................. 428/132, 138, 428/131, 905, 913; 424/443, 413; 239/53, 55, 56, 57, 58; 15/104.93, 221, 209.1

[56] References Cited

U.S. PATENT DOCUMENTS

| | | | |
|---|---|---|---|
| 3,906,578 | 9/1975 | Huber | 15/104 A |
| 4,157,237 | 6/1979 | Raley | 425/363 |
| 4,317,792 | 3/1982 | Raley et al. | 264/504 |
| 4,351,784 | 9/1982 | Thomas et al. | 264/22 |
| 4,535,020 | 8/1985 | Thomas et al. | 428/131 |
| 4,603,069 | 7/1986 | Haqe et al. | 428/76 |
| 4,614,679 | 9/1986 | Farrington et al. | 428/138 |
| 4,685,155 | 8/1987 | Finngerhut et al. | 2/272 |
| 5,409,917 | 4/1995 | Robinson et al. | 514/200 |
| 5,415,866 | 5/1995 | Zook | 424/448 |
| 5,487,889 | 1/1996 | Eckert et al. | 424/93.1 |
| 5,487,932 | 1/1996 | Dunshee | 428/68 |
| 5,536,555 | 7/1996 | Zelazoski et al. | 428/138 |
| 5,549,924 | 8/1996 | Shlenker et al. | 427/2.3 |
| 5,635,275 | 6/1997 | Biagioli et al. | 428/132 |
| 5,733,628 | 3/1998 | Pelkie | 438/138 |

FOREIGN PATENT DOCUMENTS 53-58578 5/1978 Japan .

OTHER PUBLICATIONS

Product Brochure entitled "VisPore," Tredegar Film Products, ©1993.

*Primary Examiner*—William P. Watkins, III
*Attorney, Agent, or Firm*—Jenkens & Gilchrist, P.C.

[57] ABSTRACT

The wiping device of the present invention comprises a thermoplastic sheet coupled with an optional absorbent core and an optional liquid impervious backsheet. The thermoplastic sheet defines a plurality of cavities including outwardly extending capillaries. Contained within the absorbent core for release upon demand is one or more fluids which facilitate and enhance the cleaning provided by the wiping device. As the cavities of the thermoplastic sheet are contacted with and wiped across a surface to be cleansed, the cavities collect and remove undesired material such as dirt, feces or blood. The selective release of the one or more fluids onto the surface to be cleansed further facilitates the cleaning and/or provides fragrance and/or medicaments, or the like, to the surface to be cleansed.

16 Claims, 3 Drawing Sheets

WIPING DEVICE

RELATED APPLICATION

This application is a continuation of co-pending Provisional Application Serial No. 60/037,369, filed Feb. 6, 1997, entitled Wiping Device, which is assigned to the same assignee as this application, and the totality of the disclosure of which is hereby incorporated by reference for all purposes.

FIELD OF INVENTION

The present invention relates to a fluid storage and applicator device. More specifically, the device is an improved cleansing wipe or pad. The improved wipe of this invention can provide any number of viscous fluids for cleansing or refreshing, as well as remove soil from surface being cleaned. The wipes also is capable of dispensing alcohol, water, topical anesthetics, biologicals, liquid medicaments, lotions, creams and the like, if desired.

BACKGROUND OF INVENTION

A current art for cleansing wipes utilizes a nonwoven (NW) material saturated in a cleansing fluid contained within a container associated therewith. A sheet of the cleansing wipe is pulled up through a hole and separated from the bulk of wipes within the container, for example by being torn off at a line of perforations. The sheet is subsequently used to wipe and clean a surface, such as human skin. The sheets are typically thin, porous and dripping with solution. The undesired soil or residue to be cleaned from the surface of interest by the sheet easily transmits through the sheet to contact the user. Accordingly, the act of actually removing the soil is accomplished as much by the cupped hand of the user than by the sheet. When the last sheet is removed from the container, several ounces of wasted fluid remain in the bottom. This wasted fluid represents higher costs to the manufacturer and end user as well as an introduction of additional unwanted chemicals into landfills when the container is ultimately disposed.

Other prior art wipes are constructed of absorbent material folded into a towelette containing a fluid. The packaging material for such prior art is an aluminum foil with a thermoplastic liner, for example. Such packaging material is ideally impervious to the fluid contained therein, as well as vapor or gas formed therefrom. Such material also is ideally impervious to air and other materials that might otherwise contaminate the fluid and absorbent material contained in the package. However, once the package is opened or otherwise breached, the same problems outlined above are present with respect to this prior art.

Thus there remains a need for an improved wipe capable of providing a fluid upon demand while able to physically remove undesired material from the surface to be cleansed and lacking the disadvantages described above.

SUMMARY OF THE INVENTION

The present invention comprises a fluid storage and application device including a sheet of perforated thermoplastic film. The sheet preferably has two sides. A first side of the sheet includes perforations. Ideally, these perforations are tapered capillaries narrowing in circumference as they extend outwardly away from the sheet. A second side of the sheet (opposite the outwardly extending tapered capillaries) is capable of containing for subsequent release on demand a viscous liquid. Light pressure on the second side of the sheet forces the contained fluid through the tapered capillaries of the sheet, releasing said fluid from the sheet and providing the fluid to the surface to be cleansed. The capillaries serve a second function in that they also form cavities which trap any undesired material (e.g., soil) being removed from the surface to be cleansed.

Preferably, the wipe of the present invention comprises an absorbent core including a viscous liquid, a fluid impervious sheet positioned adjacent one side of said core and a perforated plastic film positioned adjacent to a second side of said core, said second side being that which is opposite to the side associated with the fluid impervious sheet. The perforations in the plastic film form a plurality of small pockets which extend away from the absorbent core. The unique void volume space created between the cup shapes of the male side of the plastic film functions as a non-abrasive wiping/collecting mechanism. Funnel-shaped pores between the male cups of the plastic film contain and release on demand one or more fluids of various functions. The one or more fluids are stored within the absorbent core and released through the funnel-shaped pores via pressure associated with a wiping action. A top layer which is preferably constructed of a solid film blocks the user from the transmission of any fluids and/or undesired material.

BRIEF DESCRIPTION OF THE DRAWINGS

A more complete understanding of the improved wiping device of the present invention may be obtained by reference to the following Detailed Description when taken in conjunction with the accompanying Drawings wherein.

DETAILED DESCRIPTION OF THE INVENTION

A preferred construction of the improved wiping device of the present invention comprises a sheet, on top of which is located an absorbent core (e.g., wadding), on top of which is located a solid or embossed liquid impervious sheet. The absorbent core contains one or more fluids which can be released upon demand through the application of force by the user to better cleanse (e.g., a degreaser), provide fragrance (e.g., a perfume) and medicate (e.g., antibiotics, antifungals, antivirals, etc.) the surface to be cleansed. Although one or more fluids to assist in cleansing, providing fragrance and applying medications is described herein, it is noted that the one or more fluids can function for any other suitable purpose associated with use of the improved wiping device 10, such as providing an identifier (e.g., colored dye) to the surface to be cleansed.

Figure 1:
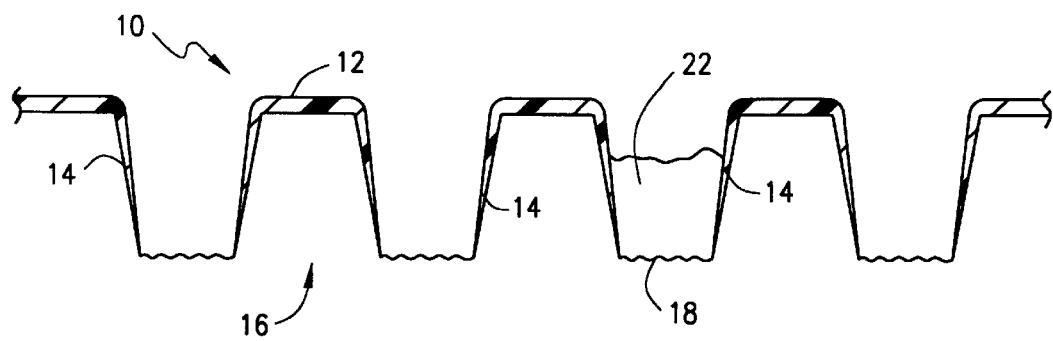
FIG. 1 is a side view in partial cross-section of an embodiment of the wiping device of the present invention.

Now referring to FIG. 1, there is shown an embodiment of the wiping device 10 of the present invention. The wiping device 10 comprises a sheet 12 of thermoplastic film. The sheet 12 includes a plurality of tapered capillaries 14 that extend away from the sheet 12. The tapered capillaries 14 define a plurality of cavities 16 on a first side of the sheet 12. The cavities 16 provide a non-abrasive wiping feature that removes undesired material from the surface to be cleansed. The type of film used for the sheet 12 and the rigidity of the capillaries 14 can be varied depending on the application of the wiping device. For example, a wiping device 10 intended for use in connection with the cleansing of the skin of an infant would need to be extremely soft and gentle in its wiping action. However, if the wiping device 10 was intended for use as a hand cleaner for adults, the sheet 12 of film and the capillaries 14 could be designed to provide a more aggressive (e.g., abrasive) scrubbing action. Examples of films that are suitable for the sheet 12 are those described in U.S. Pat. Nos. 4,351,784 and 4,535,020, the entire contents and disclosures of which are hereby incorporated herein by reference.

A film for use as a sheet 12 preferably exhibits a thickness from about 0.0003" to about 0.280" and would include from about 5 to about 75,000 capillaries per square inch of the film. In a preferred structure, the film will have a thickness from about 0.0008" to about 0.010" and from about 50 to about 15,000 capillaries per square inch of the film. The capillaries 14 preferably have a diameter from about 0.001" to about 0.185". The capillaries 14 preferably extend away from the sheet 12 by a distance of from about 0.003" to about 0.280". In a preferred structure, the capillaries 14 will have a diameter from about 0.010" to about 0.075" and the capillaries 14 will extend from the sheet 12, a distance from about 0.005" to about 0.125".

The sheet 12 is preferably constructed of a thermoplastic film having minute perforations 18 therein. The perforations 18 are preferably arranged in a regular pattern over substantially the entire surface of the film and allow the passage of air and liquids therethrough. Although a regular pattern of perforations 18 is described herein, it is noted that films including irregular or other patterns of perforations 18 are suitable for use with the wiping device 10 of the present invention. The film preferably has a liquid flow rate associated with the perforations 18. Thermoplastic films of different strengths, characteristics, colors, and dimensions are suitable for use with the wiping device 10 of the present invention.

Any thermoplastic material which may be formed into flexible film or sheet may be used in the production of the wiping device of the present invention. Exemplary thermoplastic materials include cellulose esters (e.g., cellulose acetate, cellulose propionate, cellulose butyrate); mixed esters of cellulose; cellulose ethers (e.g., ethyl cellulose); nylons and polymeric materials, such as polyvinyl alcohol acetals, polyvinyl chloride, polyvinyl chloride acetate, polystyral, methyl methacrylate, polyethylene, polypropylene, and other polyolefins which may be formed into flexible film or sheet. Particularly preferred perforated films are comprised of polyethylene and polypropylene. The film may be a low density polyethylene (LDPE). Sheets or films made from such materials may be plasticized with suitable plasticizers. Other additives known in the art also may be added to achieve various desired physical characteristics.

Surface treatment of the film of the sheet 12 for rendering the surfaces of the film more receptive to adhesives, paints, inks, lacquers, or to other surfaces in laminating processes is widely practiced throughout the plastic film industry and is also contemplated by this invention. Various types of such processes (e.g., corona discharge treatment, chemical treatment, flame treating, casing, electronic treating, plasma etching, ion plating and irradiation) can be employed, if desired.

Possible chemical treatments of the film, depending upon desired use, include anti-static agents, additives which alter the polarity of the surface, adhesion promoters and other surface modifiers. A wide variety of additives for plasticizing, coloring, impact modification, slip, anti-fogging and stabilization may be added to the film forming resin prior to the film being made. Such chemical compounds may be added batchwise in powder mixers or to the feeding mix to compounders such as Banbury mixers or compounders. U.S. Pat. No. 4,535,020 fully describes the manufacture of such thermoplastic films.

One or more liquids 22 can be stored in the cavities 16 and released through capillaries 14 and apertures 18 onto the surface to be cleansed. As discussed in more detail below, the one or more fluids 22 may be cleansers (e.g., degreaser), medications (e.g., antibiotics, antivirals, antifungals), fragrances (e.g., perfumes), identifiers (e.g., colored dyes), or the like, and combinations thereof.

Figure 2:
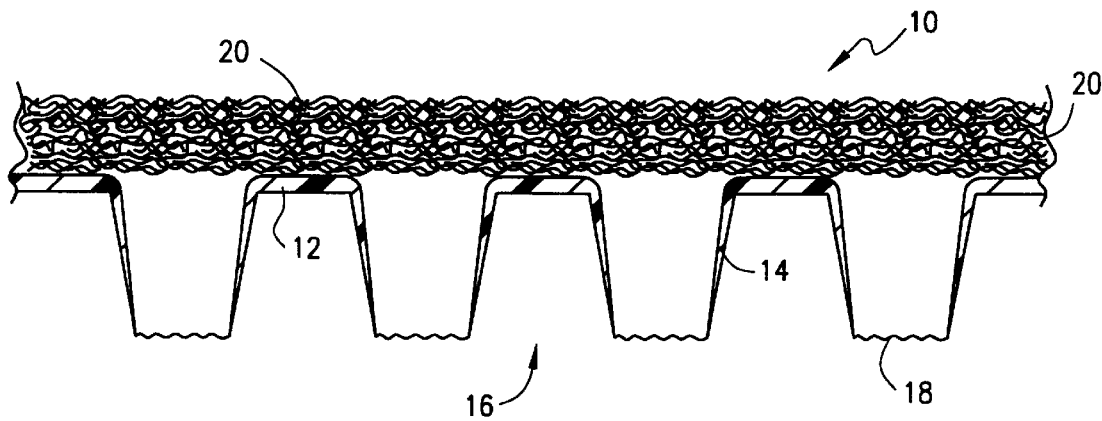
FIG. 2 is a side view in partial cross-section of a second embodiment of the wiping device of the present invention, illustrating an absorbent core material.

Now referring to FIG. 2, a second embodiment of the wiping device 10 of the present invention is illustrated. In this embodiment, resting atop the sheet 12 is an absorbent core 20. Materials for use as the absorbent core 20 include well-known materials such as creped cellulose wadding, air-laid felt nonwoven, wood pulp derivatives, etc., as well as combinations of one or more such materials.

The absorbent core 20 is preferably positioned adjacent the side of the sheet 12 that is opposite the side including the capillaries 14. The absorbent core 20 contains one or more fluids 22 described in more detail below. The one or more liquids is held in the absorbent core 20 through capillary action. When application of the one or more fluids 22 is desired, the one or more fluids 22 is squeezed out of the absorbent core 20, through the capillaries 14, through the apertures 18 and onto the surface to be cleansed by pressure exerted on the wiping device 10 by the user during a wiping action.

The one or more fluids 22 contained within the absorbent core 20 preferably exhibit a viscosity across a wide range of temperatures sufficient to prevent premature or otherwise undesired release of the one or more fluids 22 from the absorbent core 20. Such an undesired release might occur, for example, in response to pressure levels associated with routine vibration and impacts of shipping and handling. A predetermined amount of the one or more fluids 22 is contained by the core 20, precluding the waste of such fluids 22 associated with prior art devices discussed in further detail above.

As discussed above, the one or more fluids facilitate and enhance the cleansing process and comprise: a cleanser (e.g., degreaser); a medicament (e.g., antivirals, antibiotics, antifungals); a fragrance (e.g., perfume); a moisturizer (e.g., emollient creme); an identifier (e.g., colored combinations thereof.

Figure 3:
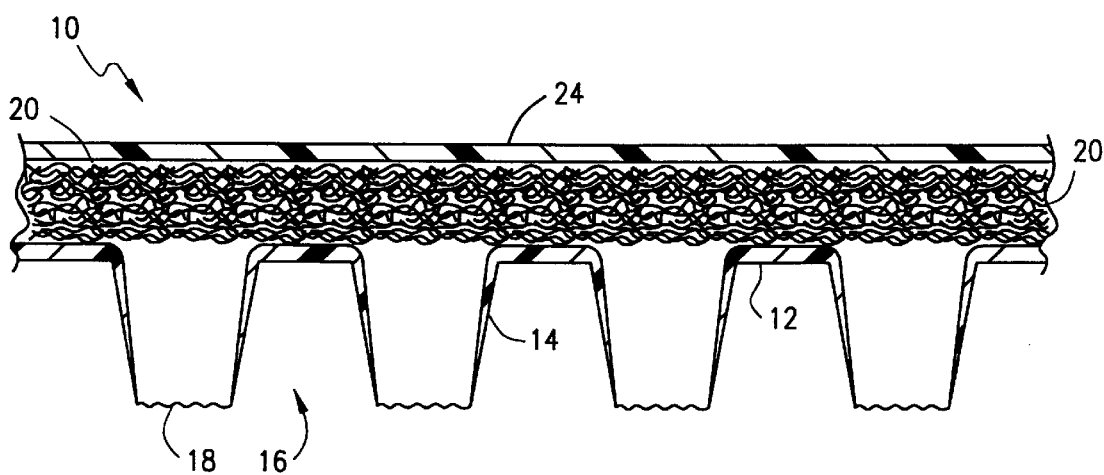
FIG. 3 is a side view in partial cross-section of a third embodiment of the wiping device of the present invention, illustrating use of a liquid impervious backsheet.

In FIG. 3, a third embodiment of the wiping device 10 of the present invention is illustrated. In this embodiment of the wiping device 10, the structure of the wiping device 10 is essentially the same as the embodiment shown in FIG. 2 with the addition of an impervious sheet 24. The impervious sheet 24 is preferably positioned over the absorbent core 20 on the side of the absorbent material that is opposite to the sheet 12. In effect, the absorbent core 20 carrying the one or more fluids 22 is sandwiched between sheet 12 and impervious sheet 24. The liquid impermeable backsheet 24 can comprise any of various materials well known in the art, such as polyethylene film.

The liquid impervious backsheet 24 is used to preclude contact between the hand/fingers of the user and the undesired material to be cleaned from the surface as well as the one or more fluids 22 held by the absorbent core 20 and released upon demand onto the surface to be cleansed. The liquid impervious backsheet 24 further serves to protect the one or more fluids 22 contained with the absorbent core 20 from contamination, evaporation, and the like.

Figure 4:
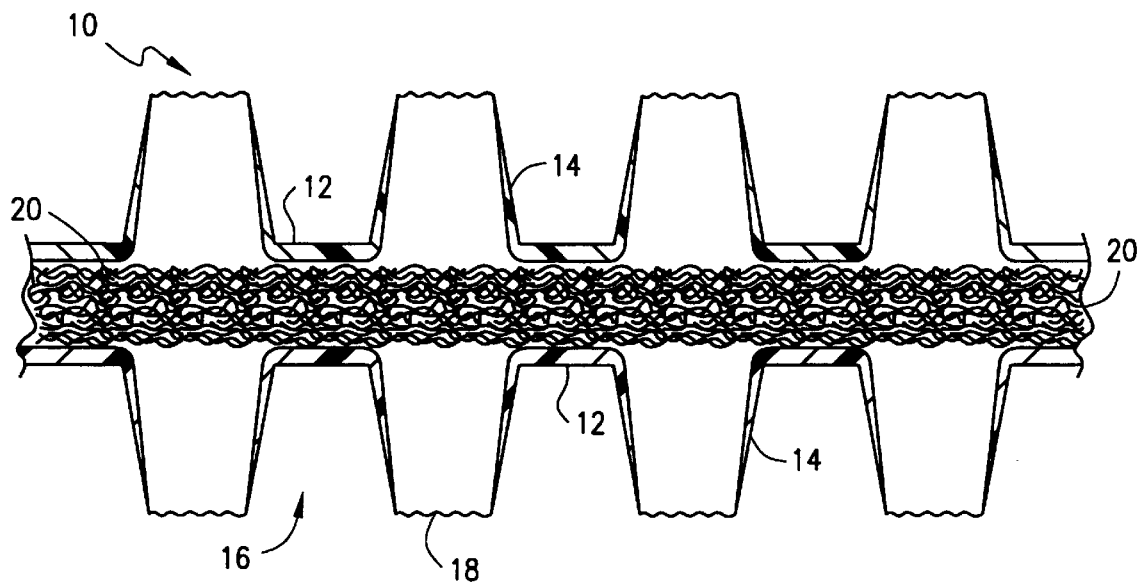
FIG. 4 is a side view in partial cross-section of a fourth embodiment of the wiping device of the present invention, illustrating use of thermoplastic sheets on both sides of the wiping device.

Now turning to FIG. 4, there is shown another embodiment of the wiping device 10 of the present invention. The wiping device 10 shown is essentially the same as the embodiment illustrated in FIG. 3 with the addition of a second sheet 12 of thermoplastic material instead of the impervious backsheet 24. In this embodiment, the one or more liquids 22 contained with in the absorbent core 20 may be squeezed out of the apertures 18 in the capillaries 14 positioned on either side of the absorbent core 20. This embodiment allows either side of the wiping device 10 to be used, as there are a plurality of cavities 16 on each side of the wiping device 10. This embodiment is particularly useful in situations where the user wants to fold over the wiping device 10 and use the other side for further cleansing.

Figure 5:
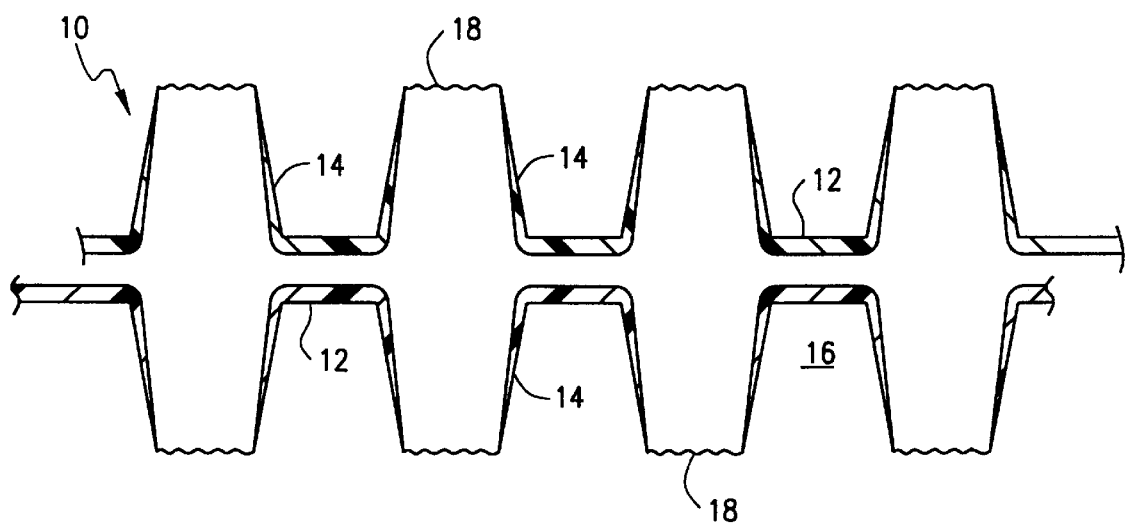
FIG. 5 is a side view in partial cross-section of a fifth embodiment of the wiping device of the present invention, illustrating use of thermoplastic sheets on both sides of the wiping device and the lack of an absorbent core.

FIG. 5 shows yet another embodiment of the wiping device 10 of the present invention. The wiping device 10 of this embodiment is essentially the same as the embodiment illustrated in FIG. 4 with the absorbent core 20 removed. In this embodiment, one or more liquids 22, if desired, can be positioned in the capillaries 14 as shown in the embodiment illustrated in FIG. 1 and described above. Alternatively, this embodiment can be utilized without the one or more fluids 22. If the one or more liquids is not utilized, the capillaries 14 could also be non-apertured.

Figure 6:
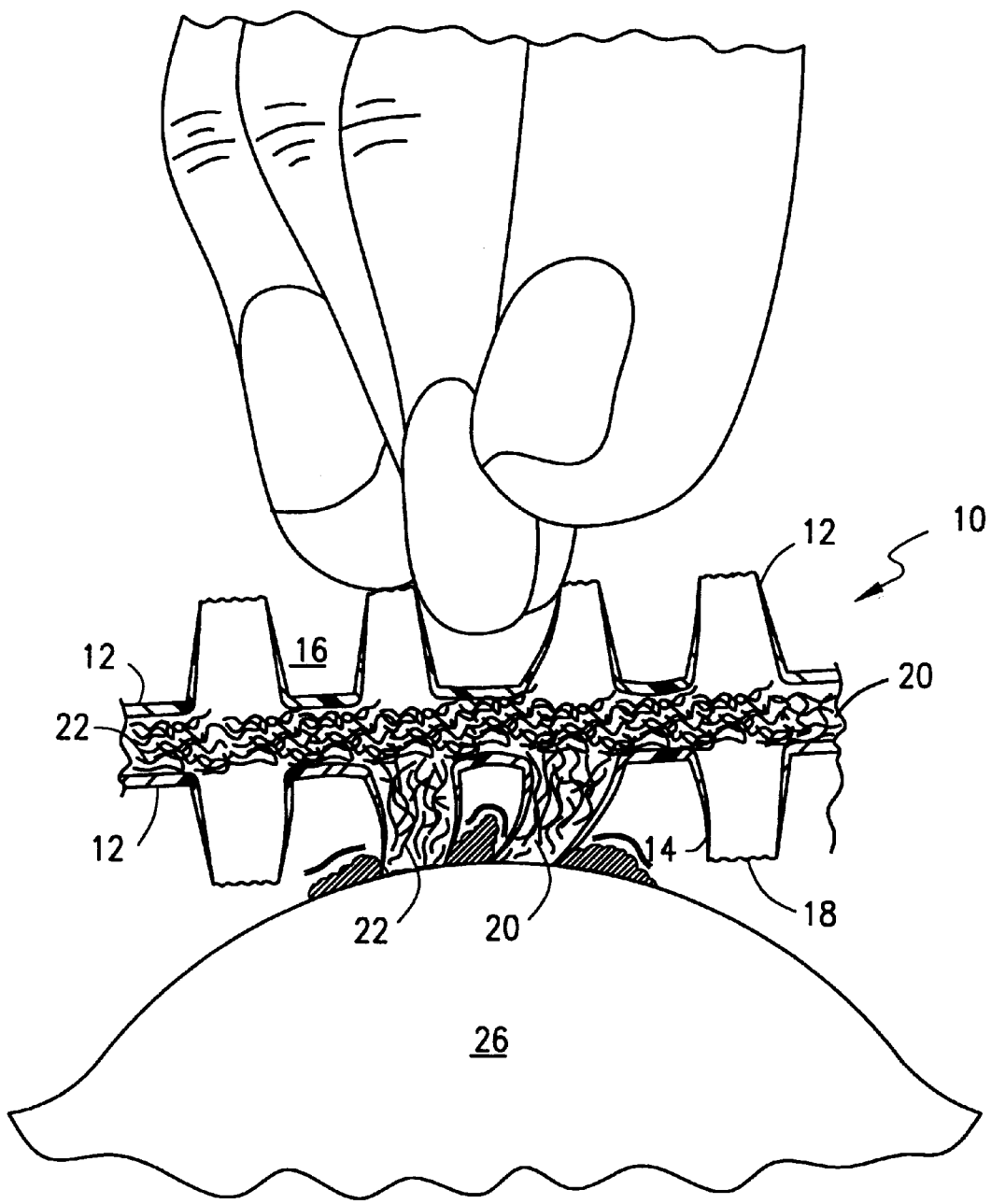
FIG. 6 illustrates the wiping device of the present invention in use.

Now referring to FIG. 6, an embodiment (FIG. 4) of the wiping device 10 of the present invention is illustrated in use. In use, the user grips wiping device 10 and wipes it across the surface to be cleansed 26 (e.g., the soiled buttocks of an infant). The one or more fluids 22 contained within the absorbent core 20 is held there by capillary action until the wiping device 10 is squeezed by the pressure of the hand of the user during use. Upon the application of such pressure, the one or more fluids 22 (e.g., cleanser, ointments, or combinations thereof) are delivered through the capillaries 14, the perforations 18 to the surface to be cleansed 26. The proper amount of the one or more fluids 22 is predetermined to prevent the waste of any such fluids either in the container or during use.

The plurality of cavities 16 defined by the capillaries 14 contacts the surface to be cleansed 26. The cavities 16 collect undesired material (e.g., feces, blood). If the embodiment having the impervious backsheet 24 (FIG. 3) is employed, contact between the hand/fingers of the user and the undesired material collected by the wiping device 10 is avoided.

If the wiping device is also sufficiently squeezed by the user during its use, the absorbent core 20 will release the one or more fluids 22 contained therein, allowing the one or more fluids 22 to travel through the capillaries 14 and the perforations 18 of the sheet 12 to be applied to the surface to be cleansed 26. Depending upon the nature of the one or more fluids 22 contained and released upon demand by the core, the surface to be cleansed 26 will be disinfected and/or fragranced and/or better cleansed.

For frequent, multiple uses of the wiping device 10 of the present invention (e.g., baby wipes), a plastic container with a closable lid can be used to store the wiping devices. The individual wiping devices may be stored within the container separately or removably connected to each other, as desired, and through means known in the art. For more infrequent single use applications, the wiping device 10 of the present invention could be packaged individually in easy-to-tear-open, moisture barrier packages.

Advantages of the wiping device 10 of the present invention over prior art device are: protection of the hand/fingers of the user from contact with undesired materials; controlled amount and release of the one or more fluids used to assist cleaning the surface to be cleansed; and superior, non-abrasive wiping action from the cavities of the sheet of the wiping device.

Although preferred embodiments of the wiping device of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A wiping device for wiping a surface, comprising:
   a thermoplastic sheet;
   said thermoplastic sheet including a plurality of perforations;
   said thermoplastic sheet further including a plurality of capillaries, said capillaries extending outwardly away from the thermoplastic sheet;
   said capillaries defining a plurality of cavities, said cavities capable of receiving and removing undesired material from said surface;
   an absorbent core associated with the thermoplastic sheet, said absorbent core containing one or more fluids which is subsequently released onto said surface in response to pressure applied to the absorbent core;
   a backsheet associated with the absorbent core such that the absorbent core is sandwiched between the thermoplastic sheet and the backsheet, said backsheet preventing contamination and evaporation of the one or more fluids of the absorbent core; and
   wherein said one or more fluids is selected from the group consisting of: a cleanser, a medicament, a moisturizer, an identifier, a fragrance, and combinations thereof.

2. The wiping device of claim 1, wherein the backsheet is liquid impervious.

3. The wiping device of claim 1, wherein the backsheet is comprised of a polyolefin.

4. A wiping device for wiping a surface, comprising:
   a first thermoplastic sheet;
   said first thermoplastic sheet including a plurality of perforations;
   said first thermoplastic sheet further including a plurality of capillaries, said capillaries extending outwardly away from the first thermoplastic sheet;
   said capillaries defining a plurality of cavities, said cavities capable of receiving and removing undesired material from said surface;
   a second thermoplastic sheet associated with the first thermoplastic sheet, said second thermoplastic sheet including a plurality of perforations;
   said second thermoplastic sheet further including a plurality of capillaries extending in a direction opposite of the capillaries of the first thermoplastic sheet;

said capillaries of the second thermoplastic sheet defining a plurality of cavities, said cavities capable of receiving and removing undesired material from said surface; and further comprising an absorbent core associated with the first thermoplastic sheet and the second thermoplastic sheet such that the absorbent core is sandwiched between the first thermoplastic sheet and the second thermoplastic sheet, said absorbent core containing one or more fluids which is subsequently released onto said surface in response to pressure applied to the absorbent core;

wherein said one or more fluids is selected from the group consisting of: a cleanser, a medicament, a moisturizer, an identifier, a fragrance, and combinations thereof.

5. The wiping device of claim 4, further comprising a container capable of containing for individual dispensing a plurality of wiping devices.

6. The wiping device of claim 4, wherein a wiping action provides a sufficient amount of pressure to release the one or more fluids contained within the absorbent core.

7. The wiping device of claim 1, wherein the thermoplastic sheet comprises a film selected from the group consisting of: cellulose esters, cellulose ethers, nylons, and polyolefins.

8. The wiping device of claim 1, wherein the absorbent core is comprised of one or more of materials on the group consisting of: creped cellulose wadding, air-laid felt nonwoven, wood pulp derivatives, and combinations of aforementioned materials.

9. The wiping device of claim 1, wherein said at least one fluid contained within said absorbent core is a medicament selected from the group consisting of: antibiotics, antivirals, antifungals and disinfectants.

10. The wiping device of claim 1, wherein said at least one fluid contained within said absorbent core is a fragrance in the form of a perfume.

11. The wiping device of claim 1, wherein said at one fluid contained within said absorbent core is a moisturizer in the form of an emollient creme.

12. The wiping device of claim 1, wherein said at least one fluid contained within said absorbent core is a cleanser in the form of a degreaser.

13. The wiping device of claim 4, wherein said at least one fluid contained within said absorbent core is a cleanser in the form of a degreaser.

14. The wiping device of claim 4, wherein said at least one fluid contained within said absorbent core is a medicament selected from the group consisting of: antibiotics, antivirals, antifungals and disinfectants.

15. The wiping device of claim 4, wherein said at least one fluid contained within said absorbent core is a moisturizer in the form of an emollient creme.

16. The wiping device of claim 4, wherein said at least one fluid contained within said absorbent core is a fragrance in the form of a perfume.

* * * * *

UNITED STATES PATENT AND TRADEMARK OFFICE
CERTIFICATE OF CORRECTION

PATENT NO. : 6,132,841
DATED : October 17, 2000
INVENTOR(S) : Guthrie et al.

It is certified that error appears in the above-indentified patent and that said Letters Patent is hereby corrected as shown below:

ON THE TITLE PAGE

Item [56] Inventor     Replace "Farrington et al."
With --Farrington, Jr. et al.--

Column 4, lines 59-60     Replace "(e.g.,colored combinations thereof."
With --(e.g., colored dye); or combinations thereof.--

Signed and Sealed this

Eighth Day of May, 2001

Attest:

NICHOLAS P. GODICI

Attesting Officer     *Acting Director of the United States Patent and Trademark Office*